FIG.1.

FIG. 2.
PRODUCT CURVE OF RECORDER TRACES OF $CO_2$ CHOPPER AND 15 μ NARROW BAND FILTER.

| HEIGHT | SPECTRAL INTERVAL cms⁻¹ | | |
|---|---|---|---|
| | 706 716 | 726 736 | 746 756 |
| 60,000 | 3·1 | 180 | 1300 |
| 50,000 | 1·4 | 81 | 570 |
| 40,000 | 5·0 | 30 | 210 |
| 30,000 | 2·3 | 14 | 94 |
| RANGES FOR r=1 (KILOMETRES) | | | |

CURVE A NO ABSORBING CELL
CURVE B ABSORBING CO₂ CELL PRESENT

3,498,132
Patented Mar. 3, 1970

3,498,132
RADIOMETER APPARATUS
Stanley Desmond Smith, Reading, and John Theodore Houghton, Oxford, England, assignors to National Research Development Corporation, London, England, a British corporation
Filed Feb. 23, 1968, Ser. No. 707,599
Claims priority, application Great Britain, Mar. 1, 1967, 9,790/67; Feb. 9, 1968, 6,645/68
Int. Cl. G01j 5/10
U.S. Cl. 73—355        28 Claims

ABSTRACT OF THE DISCLOSURE

An apparatus for detecting or measuring infrared radiation emitting from a region of the atmosphere to provide an indication of the temperature of the region. Basically the apparatus comprises an optical system, a band pass filter, a chopper, a detector, and a chamber containing carbon dioxide. These components are arranged to provide an output signal which is dependent on the radiation intensity at wavelengths of the absorbtion lines of the radiation, this intensity being related to the temperatures of the region from which the radiation is emitted. The apparatus may be mounted in a satellite to measure the temperature of the earth's atmosphere or in an aircraft to detect clear air turbulence.

---

This invention relates to radiometer apparatus, and more particularly with the detection and/or measurement of radiation emitted by an atmosphere, for example, the terrestrial atmosphere.

The radiation emitted by an atmosphere is absorbed in passing through the atmosphere, the atmospheric absorption coefficient being strongly dependent on the radiation frequency. Theoretical analysis of the self-absorption in an atmosphere of radiation emitted thereby has shown that the radiation of a given frequency and having, therefore, a predetermined absorption coefficient, which is detected after passing through the atmosphere, may be identified as originating predominantly in a predetermined region of the atmosphere remote from the detecting station. by measuring the intensity of the radiation at the frequency, it is possible to measure parameters such as the temperature of the emitting region. Thus, for example, a detector disposed above the atmosphere and receiving radiation emitted therefrom at a sharply defined frequency is capable of identifying the radiation as originating predominantly between predetermined heights.

Alternatively a detector disposed in the atmosphere and receiving radiation in a substantially horizontal direction emitted therefrom at a sharply defined frequency is capable of identifying the radiation as originating predominantly between predetermined distances.

The theoretical analysis referred to above applies to radiation having a clearly defined absorption coefficient, that is, monochromatic radiation. The noise performance of any practical detector determines the minimum detectable energy and in the present case insufficient energy is available to permit detection at a single frequency. In general, therefore, a detector will be responsive to radiation having a finite range of frequencies, over which the absorption coefficient will vary considerably. The need for adequate radiation grasp or energy gathering power conflicts in most radiometer apparatus with the need for a narrow detected spectral band width and in general one of these requirements is met only at the expense of the other.

The present invention provides apparatus in which the detected radiation is confined to frequencies having substantially the same absorption coefficient or absorption coefficients of the same order, so that by an application of the principle referred to above, the apparatus is capable of measuring radiation emitted by regions of an atmosphere remote from the apparatus.

Absorption in a predetermined quantity of a component of the atmosphere is used to define in the detected radiation frequencies in respect of which the absorption coefficient is substantially the same, or of the same order.

According, therefore, to one aspect of the present invention there is provided apparatus for indicating radiation emitted from a predetermined region of an atmosphere, said apparatus comprising an optical system for collecting radiation emitted from said atmosphere over a given solid angle, band pass filter means for passing a predetermined band of the emission spectrum of a given component of said atmosphere, said component having absorption lines in said band, a chopper device for interrupting the received radiation cyclically, a first chamber containing a predetermined amount of said atmospheric component, a second chamber containing a predetermined smaller amount of said atmospheric component than the first chamber, and detector means, the chopper device being adapted to cause the filtered radiation to pass to the detector means through the first and second chambers alternately, said detector means being tuned to the cyclic chopping frequency and adapted to provide an output signal which is dependent upon the radiation intensity and corresponds to radiation at the wavelengths of the centres of the absorption lines in the pass band of the filter means, said wavelengths being such that the atmospheric absorption coefficients at said detected wavelengths are substantially the same and the radiation is known to originate predominantly from said predetermined region of the atmosphere.

The apparatus according to the invention combines the advantages of fine resolution with adequate energy gathering power. The spectral band width of the detected radiation and, therefore, the precision with which the atmospheric absorption coefficient is defined, is determined by the relatively narrow width of the absorption lines of the atmospheric component, while the fact that a plurality of absorption lines is detected in the band pass of the filter means ensures an adequate radiation grasp, the apparatus in effect having a multiplex characteristic (that is, detecting a number of wavelengths simultaneously) within the band pass of the filter means.

According to a further aspect of the present invention there is provided an apparatus for indicating radiation emitted from a predetermined region of an atmosphere, the apparatus being adapted to be mounted on a platform above the emitting regions of the atmosphere and comprising an optical system for collecting radiation emitted from said atmosphere in a relatively large solid angle from directly beneath the apparatus, band pass filter means for passing a predetermined band of the emission spectrum of a given component of said atmosphere, said component having absorption lines in said band, a chopper device for interrupting the received radiation cyclically, a chamber through which the chopper device causes the radiation to pass periodically said chamber containing a predetermined amount of said atmospheric component, and detector means tuned to the cyclic chopping frequency and adapted to provide an output signal which is dependent on the radiation intensity at wavelengths of said absorption lines, said wavelengths being such that the atmospheric absorption coefficients at said detected wavelengths are substantially the same, and the detected radiation passed by the filter means is known to originate predominantly in a predetermined atmospheric level, whereby the intensity of said detected radiation provides an indication of an atmospheric parameter such as temperature at said level.

In this embodiment a fixed inclined mirror may be disposed in the entrance aperture of the chamber covering substantially half said aperture, said mirror being arranged to direct a reference background radiation through one half of the chamber, the other half being arranged to receive the atmospheric radiation, and the chopper device comprising a cyclically movable vibratory or rotary member which alternately admits through the background radiation and the atmospheric radiation.

In the single chamber embodiment referred to above, the chopper device preferably comprises an oscillatory black member which at all times remains in the field of view of the detector means. In the double chamber embodiment, however, the chopper device preferably comprises a movable reflector which is arranged to direct radiation emitted by the atmosphere through the first and second chambers alternately, the optical system being arranged to direct a reference background radiation through the chamber which is not transmitting atmospheric radiation.

The said reference background radiation may be provided by a part of the optical system which is adapted to receive radiation from outer space.

According to a yet further aspect of the present invention there is provided an apparatus for indicating radiation emitted from a predetermined region of an atmosphere, comprising an optical system for collecting radiation emitted from said atmosphere over a given solid angle in a substantially horizontal direction, band pass filter means for passing a predetermined band of the emission spectrum of a given component of said atmosphere, said component having absorption lines in said band, a chopper device for interrupting the received radiation cyclically, a chamber through which the chopper device causes the radiation to pass periodically said chamber containing a predetermined amount of said atmospheric component, and detector means tuned to the cyclic chopping frequency and adapted to provide an output signal which is dependent on the radiation intensity at wavelengths of said absorption lines, said wavelengths being such that the atmospheric absorption coefficients at said detected wavelengths are substantially the same and the detected radiation passed by the filter means is known to originate predominantly from a region at a predetermined horizontal range, the intensity of the detected radiation providing an indication of an atmospheric parameter such as temperature in said region.

In this case the chopper device preferably comprises a rotary member.

The filter means preferably comprises a multiple layer interference filter. The successive layers of the interference filter may be deposited on a plane surface or a lens in the optical system.

The radiation may be directed into the detector means by means of a light guide having a frusto-conical reflecting surface.

For effecting quantitative measurements the chopper device is preferably disposed in the entrance aperture of the optical system.

The chopper device may be arranged to direct into the detector means radiation from different spatial areas in the said region alternately, whereby the detector means are responsive to differences in the intensity of radiation received from said areas to provide an indication of relative inhomogeneities therebetween. Said chopper preferably rotates in an image plane of the optical system and remains at all times in the field of view of the detector means, the occluding area of the chopper member being substantially half the area of the field of view in the image plane.

The apparatus may be mounted in an aircraft on a platform to detect inhomogenieties in the atmosphere ahead of the aircraft. The platform on which the apparatus is mounted may be stabilized so that the apparatus receives radiation from substantially the same region of the atmosphere independent of the attitude of the aircraft. Preferably means are provided to oscillate this platform in the horizontal direction so that the apparatus scans the said region of the atmosphere.

The invention will be more particularly described, by way of example only, with reference to the accompanying drawings, in which.

The invention will first be described with particular reference to its application to the vertical resolution of radiation emitted by an atmosphere, that is, the discrimination of different emitting layers or levels in an atmosphere. It will be supposed that the radiation emitted by the atmosphere is detected at a station disposed above the emitting layers. This if the atmosphere is the terrestrial atmosphere the detector may be mounted in a balloon or satellite above the atmosphere.

Figure 1:
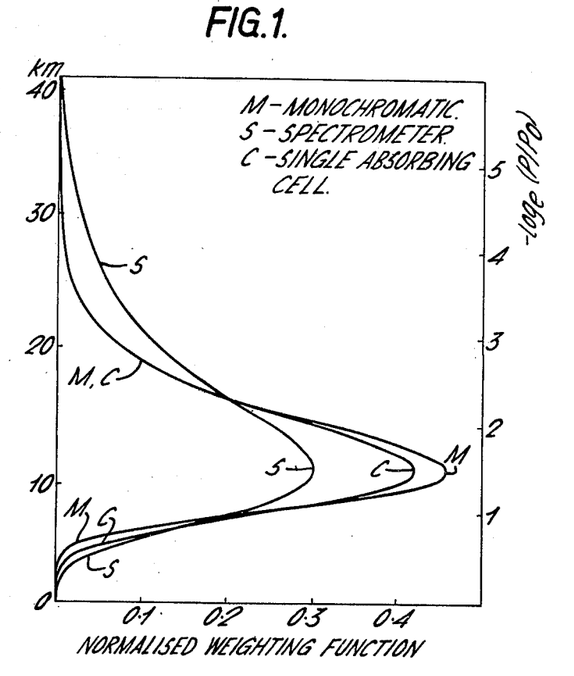
FIGURE 1 illustrates graphically height resolution obtainable with one embodiment of the invention.

Thermal emission of radiation from the atmosphere takes place in the radio, microwave and infra-red regions of the spectrum. The most likely object in measuring the intensity of radiation emitted from different levels in the atmosphere is to determine the radiating temperature of the emitting regions. For this purpose it is most useful to examine the infra-red emission. For monochromatic radiation having a clearly defined atmospheric absorption coefficient $k$, it is possible to derive theoretically the height distribution of the origin of the radiation emitted by a given atmospheric component. The height distribution of the origin of accurately monochromatic infra-red radiation emitted by atmospheric carbon dioxide is illustrated in FIGURE 1 by curve M which represents graphically a "weighting function" $dT/dz$, where T is the transmission of the atmosphere for a given spectral region between the height $z$ and the top of the atmosphere. The curve M has a maximum at a height of about 10 kilometers. The height at which the maximum occurs is a function of the absorption coefficient $k$ at the particular frequency of the radiation, but the width of the maximum is substantially independent of the absorption coefficient and is approximately 10 kilometers in height units.

In practice, however, it is not possible to detect accurately monochromatic frequencies, because a minimum incident energy is required at the detector to give sufficient measuring accuracy. If a spectrometer detector is used for detecting within a band width in wave numbers of 5 cm.$^{-1}$, the height resolution of the detected radiation is illustrated graphically by the weighting function, curve S in FIGURE 1. It will be seen that there is a severe degradation of height resolution as compared with the monochromatic curve M; this is due to the inclusion in the band width of the detector of regions where the absorption coefficient $k$ of the atmospheric component, in this case carbon dioxide, varies between wide limits, that is, between maxima at absorption line centres and minima between absorption lines.

The height resolution can be improved without decreasing the overall band width of detection by decreasing the range of variation of the absorption coefficient $k$ for the radiation detected within the band width. This is done according to the present invention by passing the incident radiation received from the atmosphere through a predetermined absorbing path of the emitting component, in this case carbon dioxide, before the radiation enters the detector. The radiation at wavelengths of very strong absorption coefficient, corresponding to the centres of the absorption lines, is thereby removed and the absorption coefficient for the detected radiation values between smaller limits. The effect of introducing a single absorbing path in front of the detector in this way is illustrated graphically by the weighting, function or height distribution curve C, which is seen to approximate in its height resolution to the ideal monochromatic curve M.

Figure 2:
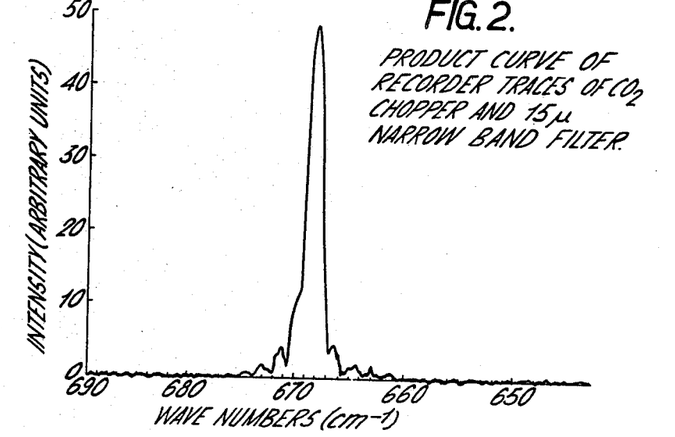
FIGURE 2 illustrates graphically the spectral characteristic of the detected radiation.

The present invention uses a band pass filter to effect the basic selection of the spectral band to be examined in the emitted radiation. Within the band pass of the filter further selection is then made of radiation having wavelengths at which the atmospheric absorption coefficients are substantially the same, that is to say, where the absorption coefficients lie within the smallest possible range, so as to improve the height resolution of the radiation detected within the pass band. Two techniques of selective absorption are used, according to the atmospheric level which is to be examined by means of the detected radiation. These techniques will be illustrated with reference to the examination of infra-red radiation emitted by carbon dioxide in the atmosphere, in which case carbon dioxide is used as the absorbing component. It will be appreciated however, that the technique is applicable to the examination of radiation from any other component of the atmosphere such, for example as oxygen, ozone, methane or water vapour. FIGURE 2 illustrates the spectral form of carbon dioxide absorption lines in the Q-branch region located within the pass band of a 15 micron narrow band filter.

A single absorption cell containing carbon dioxide to absorb out in effect, the centres of the absorption lines, is used to examine radiation from relatively lower levels in the atmosphere, as illustrated by the curve C (FIGURE 1) referred to above. By absorbing out the line centres the radiation examined has a relatively small range of absorption coefficients corresponding to the "wings" of each absorption line.

To observe radiation originating from higher atmospheric levels the incident radiation is passed alternately, by using a chopping technique, through a first absorption chamber containing a predetermined quantity of carbon dioxide and a second chamber which is evacuated, the detector being tuned to the chopping frequency. The detector output is then representative of the difference between the intensities of the radiation transmitted through the two chambers and therefore represents the intensity of the radiation received at the wavelengths of the carbon dioxide absorption line centres.

Figure 3:
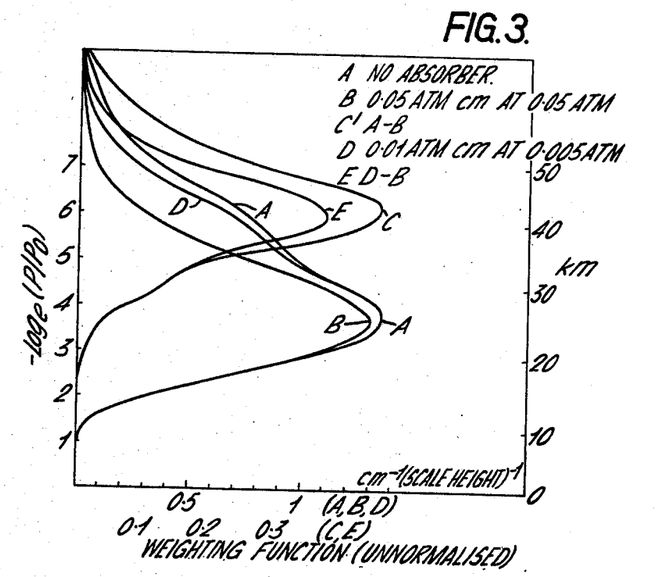
FIGURE 3 illustrates graphically the operation of one embodiment of the invention to achieve height resolution of detected radiation originating from relatively higher levels in the atmosphere.

The height resolution obtainable with this "selective chopping" technique is illustrate graphically in FIGURE 3, Curve A represents the height distribution curve or weighting function for a wave number interval of 5 cm.$^{-1}$ (that is, the pass band of the filter) including the Q-branch of the 15 micron perpendicular band of carbon dioxide at 667.4 cm.$^{-1}$. This represents the height resolution obtainable using a simple spectrometer with a resolution of 5 cm.$^{-1}$ and corresponds to transmission through the second, evacuated chamber. Curve B shows the weighting function for the same spectral interval but using, in addition, a small absorbing path of carbon dioxide, corresponding to transmission through the first chamber. The detector is responsive to the difference between the radiation detected when no absorber is present (A) and that detected when a small absorbing path or carbon dioxide is present (B) and the detected radiation therefore has an effective weighting function as depicted by curve $$C'=A-B$$

It will be seen that the curve C' has a maximum at a higher level than either or curves A or B. Thus the selective chopping technique enables information to be obtained from higher levels of the atmosphere, in this example from heights of about 45 kilometers, than that obtained using a single absorption cell (curve C, FIGURE 1). Physically, the effect of selective chopping is to render the detector responsive only to radiation at the wavelengths of the carbon dioxide absorption line centres within the pass band of the filter where the absorption coefficient $k$ is large, such radiation reaching the detector only from the higher and, therefore, nearer levels of the atmosphere.

Figure 4:
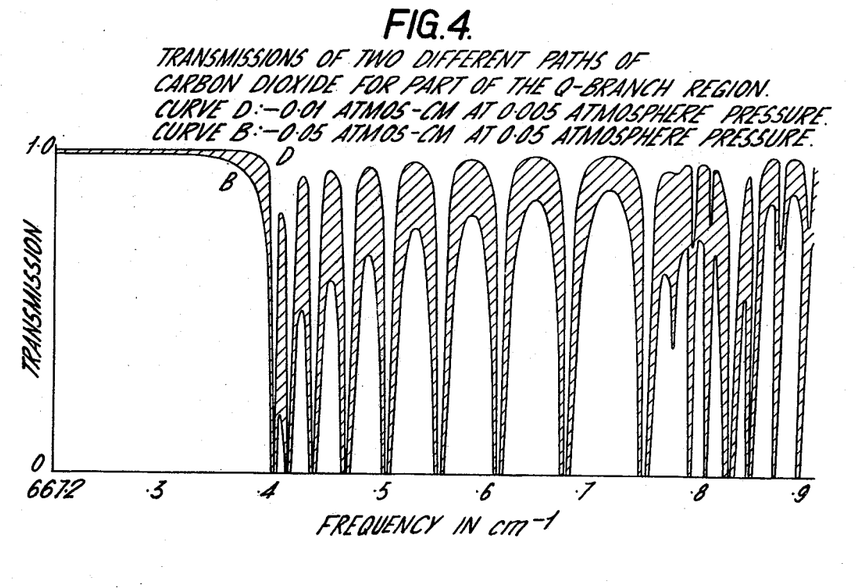
FIGURE 4 illustrates graphically the transmissions of two different paths of carbon dioxide for part of the Q-branch of the molecular spectrum thereof.

Even at the absorption line centres, however, there is a considerable variation of absorption coefficient $k$; the height resolution obtainable by the selective chopping technique can be improved further by providing in the second chamber, instead of a vacuum as referred to above, another path of carbon dioxide at a much lower pressure than that in the first chamber. The carbon dioxide in the second chamber absorbs radiation at wavelengths very close to the line centres, and as a result the tuned detector is responsive substantially to wavelengths corresponding to a more narrowly defined range of absorption coefficient $k$. This is again illustrated graphically in FIGURE 3 by reference to the weighting functions or distribution curves, curve B corresponding to the radiation transmitted through carbon dioxide in the first chamber at a pressure of 0.05 atmosphere and curve D corresponding to radiation transmitted through carbon dioxide in the second chamber at a pressure of 0.005 atmosphere. The resulting weighting function $E=D-B$ is seen to be more sharply defined than that (C') corresponding to the second chamber being evacuated. This is further illustrated in FIGURE 4 which shows the relative transmissions through the first and second chambers corresponding to curves B and D of FIGURE 3. The shaded area represents the effective transmission characteristic of the selective chopping system, that is, the area in which the detector is responsive.

Figure 5:
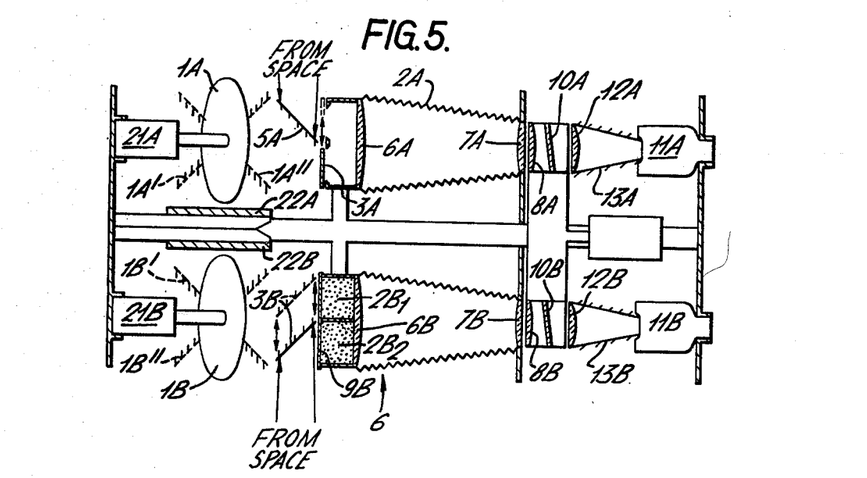
FIGURE 5 illustrates diagrammatically and partly in section apparatus according to the one embodiment of the invention.
Figure 6:
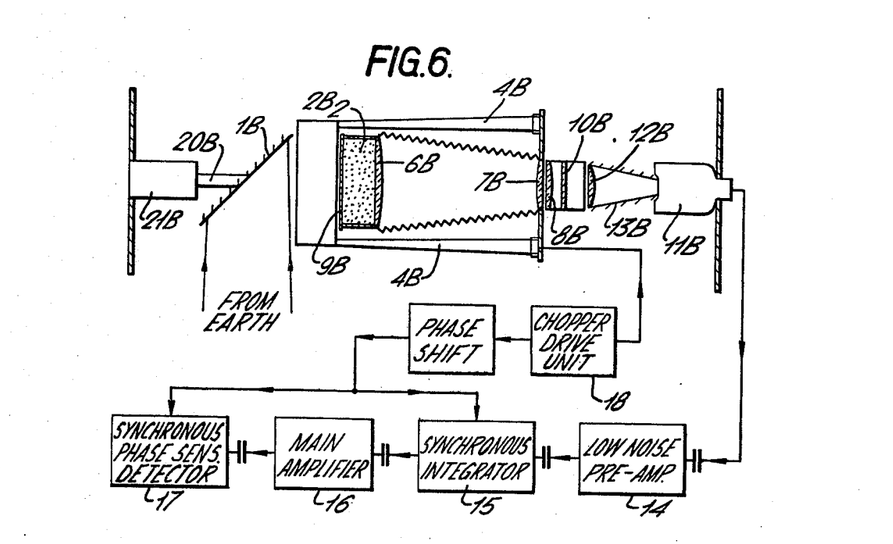
FIGURE 6 is a diagrammatic view partly in section of the apparatus shown in FIGURE 5 viewed in the direction of arrow 6 in FIGURE 5.

A practical embodiment of radiometer apparatus according to the invention is illustrated diagrammatically in FIGURES 5 and 6. This apparatus is designed to be mounted on a weather-monitoring satellite and comprises a number of different channels which are adapted to be responsive to radiation originating at difference atmospheric levels, as described above, to enable the vertical temperature structure of the atmosphere to be deduced.

Two channels A, B are illustrated in FIGURE 5, channel A being an absorption channel and being responsive to radiation from a lower atmospheric level and channel B being a selective chopping channel and being responsive to radiation from a higher level. Corresponding components of channels A, B will be identified by the same reference numerals with the suffix A or B as the case may be. Each channel is arranged to be mounted with its axis substantially horizontal and incident radiation from the earth (and the intervening atmosphere) within a given solid angle (approximately 10° in selection) is directed into each channel A, B by a respective inclined mirror 1A, 1B formed of aluminum and having a gold-plated reflecting surface.

A single absorption chamber 2A, filled with a predetermined pressure of carbon dioxide, is provided in channel A, and two separate chambers $2B_1$, $2B_2$, arranged side by side, are provided in channel B, chamber $2B_1$ containing carbon dioxide at a first predetermined pressure and chamber $2B_2$ being evacuated or containing carbon dioxide at a second, lower, pressure.

An oscillatory chopper device comprising a black blade 3A is arranged in the entrance aperture of channel A. The chopper blade 3A has an area equal to one-half the area of the entrance aperture. An oscillatory chopper 3B is arranged in the entrance aperture of channel B and comprises an inclined mirror, also occupying one-half of the entrance aperture, and arranged so as to direct radiation from outer space into the respective part of the entrance aperture in front of which it is disposed. Each chopper 3A, 3B is mounted at the free ends of a respective pair of cantilever leaf springs 4A, 4B one pair of which is shown in FIGURE 6, which are arranged to be maintained in oscillation electrically at the same frequency (15 cycles/sec.) and in phase opposition so that the respective choppers 3A, 3B execute vibratory motion in the entrance apertures of the respective channels A, B, occluding each half of the respective entrance apertures alternately.

A fixed mirror 5A is disposed in front of one half of the entrance aperture of channel A and is arranged to direct radiation from outer space through said one half of the chamber 2A when the chopper blade 3A is out of the path of said radiation, the other half of said cell receiving terrestrial radiation from the mirror 1 when the chopper blade 3A is between the mirror 5A and the chamber 2A.

The optical system of each channel A, B is substantially identical and includes infra-red germanium lenses 6A, 6B, 7A, 7B and 8A, 8B arranged in succession. This optical system is arranged to define the requisite field of view of the respective channel and to direct the incident radiation into a respective band pass filter 10A, 10B.

Each filter 10 comprises a multi-layer interference filter formed by applying successive coatings to a germanium plate or to a surface of one of the lenses of the system. Such multilayer interference filters may be:

(a) a very narrow band 10-layer Fabri-Perot type filters with fractional band widths of ½% (3 cm.$^{-1}$ at 667 cm.$^{-1}$) and wavelength positioning accuracy around 1/6% (1 cm.$^{-1}$), or (b) a 15-layer double half wave filters with a half width of 10 cm.$^{-1}$ a wavelength positioning accuracy of ±3 cm.$^{-1}$ a wavelength positioning accuracy of ±3 cm.$^{-1}$, or (c) a low pass 12μ blocking filter which links the rejection regions of filters in (a) and (b).

The lenses 7, in each channel may be regarded as a single system, the entrance aperture in which the respective chopper 3 is located and the aperture in which the respective filter 10 is located being disposed in respective focal planes of this system. The carbon dioxide absorption chamber 2A in channel A is contained between the germanium lenses 6A, 7A while the twin chambers $2B_1$, $2B_2$ of channel B are contained between the first lens 6B and a plane window 9B disposed in the entrance aperture. Thus the carbon dioxide path length for channel A is in this case an order of magnitude greater than the path lengths in channel B.

The radiation passing through each filter 10 is directed onto a detector 11 by a germanium field lens 12 and a frusto-conical light guide 13 having a gold-plated internal reflecting surface. Each respective detector 11A, 11B, comprises a thermistor bolometer or pyro-electric detector the latter having a better signal to noise ratio than a thermistor bolometer. The use of a cooled detector introduces difficulties, however, a liquid helium (4° K.) Dewar designed suitable for flight use, or a Joule-Thompson two stage mini-cooler, capable of achieving 20° K. may be employed. A low pass blocking filter is deposited on each field lens 12. The surfaces of all lenses and windows in the optical system are rendered non-reflecting at a wavelength of 15 microns by means of a quarterwave coating of zinc sulphide.

The detector 11A in channel A receives alternately radiation from earth and space. Since the black chopper blade 3A is at all times disposed in field of view of the detector 11A, radiation emitted by the blade 3A itself is not detected. In channel B the detector 11B receives radiation from the earth's atmosphere which has passed through one of the two chambers $2B_1$, $2B_2$, the other chamber transmitting reference radiation from outer space, and the atmospheric radiation being directed through the chambers $2B_1$, $2B_2$ alternately at the chopping frequency. The radiation received from outer space in each channel A, B is used as a convenient reference background against which the radiation received from the earth's atmosphere is measured.

Each respective detector 11A, 11B comprises a thermistor bolometer or other suitable detector. The electronic circuit associated with one of the detectors 11 is illustrated schematically in FIGURE 6; it will be understood that a similar circuit is provided for each channel. Each detector 11 is followed by a low noise transistor pre-amplifier 14 and a synchronous integrator 15. By using the integrator 15 a wide band main amplifier 16 may be used. The output of the main amplifier 16 is detected by means of a phase sensitive detector 17. The integrator 15 and detector 17 are synchronized to the chopping frequency by means of a reference signal derived from a drive unit for the respective chopper 3, indicated diagrammatically at 18.

The output of the respective phase sensitive detectors 17 will be indicative of the intensity of the infra-red radiation originating predominantly from a predetermined atmospheric level, in accordance with the pass band of the respective filter 10 and the pressure of carbon dioxide in the respective absorption path or paths as explained above.

Figure 7:
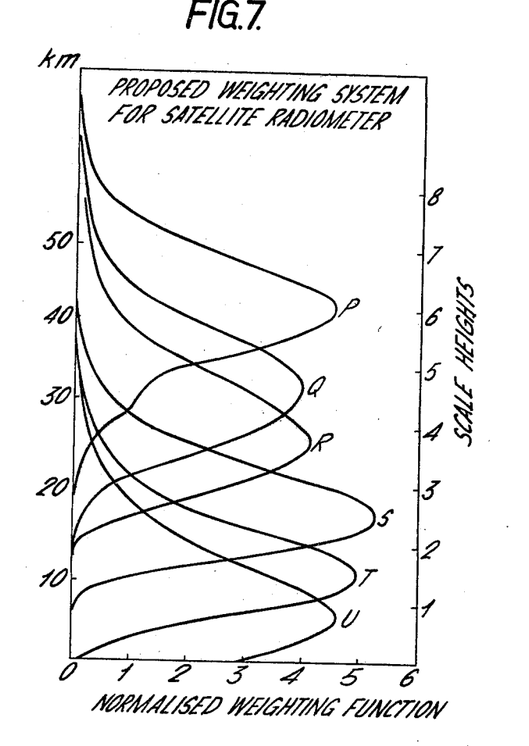
FIGURE 7 is a graphical representation of different detecting channels provided in a practical embodiment of the invention.

In one radiometer according to the invention six different channels (P-U) were provided, having characteristics as specified below in Table I. The height discrimination of the different channels is illustrated graphically by the respective weighting function curves for the channels in FIGURE 7, the curves being numbered P-U in accordance with the channel identification letters given in Table I.

TABLE I

| Channel Number | Double or single cell | CO₂ cell Path length | CO₂ cell Pressure atmos. | Filter Centre, cm.$^{-1}$ | Filter Equivalent¹ width (or integrated area), cm.$^{-1}$ | Equivalent width after selective absorbing or selective chopping cm.$^{-1}$ |
|---|---|---|---|---|---|---|
| 1(P) | Double | 1 / 1 | 0.01 / 0.05 | 668 | 5.75 | 1.3 |
| 2(Q) | do | 1 / 1 | 0.05 / 0.2 | 668 | 5.75 | 1.6 |
| 3(R) | Single | 10 | 0.03 | 668 | 5.75 | 2.5 |
| 4(S) | do | 10 | 0.2 | 675 | 11.6 | 6.3 |
| 5(T) | do | 10 | 0.6 | 697 | 9.5 | 3.5 |
| 6(U) | do | 10 | 0.3 | 712 | 11.6 | 10.3 |

¹ For a Fabry-Perot filter, the integrated area is equal to $\frac{\pi}{2}$ times the half width.

Channels 1 and 2 (P,Q) are "selective chopping" channels and have twin-cell absorption chambers similar to chambers $2B_1$, $2B_2$ in FIGURE 5 and channels 3 to 6 (R–U) are absorption channels and have single absorption chamber similar to chamber 2A in FIGURE 5.

Two types of interference filter 10 are employed in the different channels of Table I. The channels P, Q, R used for detecting radiation from higher levels employ very narrow band ten layer Fabry-Perot filters having half-widths of approximately 4 cm.$^{-1}$ at a wave number of 668 cm.$^{-1}$ in the carbon dioxide Q-branch. Channels S, T, U, which detect radiation from lower levels, employ wider band width filters comprising thirteen layer double half-wave filters having half-widths of approximately 10 cm.$^{-1}$. The interference filters 10 may be fabricated with a circular aperture of ½ inch diameter and can be used in radiation with a divergence angle equal to or less than 20° (that is, up to 10° off axis); an increase in the diameter of the filter 10 or in the divergence angle beyond these values tends to produce significant broadening of the spectral profile of the pass band of the filter.

It is possible to estimate the time constant of the intergrator 15 according to the accuracy required by the radiometer apparatus. The different channels in the apparatus described in the above example are designed to measure atmospheric temperatures at the different heights. It is known that the atmospheric temperature in the range of altitudes concerned varies between approximately 200 and 280° K. The change in the energy $\Delta E$ radiated by a black body at these temperatures in a small spectral interval at 15 microns for a temperature change $\Delta T$ in the black body may be calculated and is as follows:

At 280° K. $\Delta E = 1.53 \times 10^{-7} \Delta T$ watts/sq. cm./unit solid angle/unit wavenumber range At 200° K. $\Delta E = 0.7 \times 10^{-7} \Delta T$ watts/sq. cm./unit solid angle/unit wavenumber range To make maximum use of the available energy all the energy within the 20° divergence angle of the filter 10 should be condensed onto the detector 11. The minimum detector diameter onto which the radiation from a ½ inch aperture with 20° divergence can be condensed is (½ sin 10°) inches or 2.2 millimeters. This is therefore the approximate area of the radiation-receiving surface of the radiometer detector 11.

The narrowest spectral band width of any of the channels referred to above is about 1.5 cm.$^{-1}$. Allowing a factor of 0.05 for the transmission of all optical components, including the filters, the energy transmitted by the filters and condensed onto the detector 11 in the case of a source at a temperature of 280° K. will be:

$$1.31 \times 10^{-9} \Delta T \text{ watts} \quad (1)$$

This figure must be compared with the detector noise figure to estimate the integrating time constant. If a field of view 100 miles in diameter at the earth's surface is assumed, then, with a satellite speed of 328 nautical miles per minute (corresponding to an orbital period of 107 minutes) this field of view is completely changed in 26 seconds. The integrating time constant of the integrator 15 must be somewhat shorter than this; in practice, to equate the contributions of the field of view and the time constant to the spatial resolution the time constant should be about 6.5 seconds, corresponding to an equivalent square wave band width of ⅟₁₃ cycles/sec.

Using phase sensitive detection the noise equivalent power from the detector is then:

$$1.67 \frac{1}{\sqrt{2}} \sqrt{\frac{1}{13}} \times 10^{-9} = 3.28 \times 10^{-10} \text{ watts} \quad (2)$$

If this figure is compared with the estimated signal strength (1) the temperature change $\Delta T$ required to give a signal equal to the RMS noise is approximately 0.25° K. at a source temperature of 280° K. and 0.54° K. at a temperature of 200° K. The angular field of view at the radiometer apparatus is 10° if the field of view is 100 miles in diameter at the earth's surface and the height of the satellite is 600 miles. This is half the divergence of radiation passing through interference filter 10, and accordingly the entrance aperture of the radiometer channel must be twice the filter aperture, that is, 1 inch.

It should be noted that the maximum energy which can be collected by the detector, or the "radiation grasp" is determined by the maximum permissible divergence at the interference filter 10. It is therefore the low resolution element of the optical system, that is, the intereference filter 10, rather than the high resolution element (the absorption lines of the carbon dioxide) which determines the energy collected. Thus all the carbon dioxide lines within the pass band of the filter contribute to the signal detected by the detector: within the pass band of the filter, therefore, the radiometer apparatus has the relatively high radiation grasp associated with multiplex spectroscopy.

Referring to FIGURES 5 and 6, provision is made for periodical calibration checks on the overall gain of the channel and the zero adjustment of each channel of the radiometer apparatus. For this purpose each mirror 1A, 1B is mounted on a shaft 20A, 20B of a respective electrically driven stepping motor 21A, 21B disposed in front of each respective channel A, B. A refreence black body 22A, 22B is mounted adjacent each mirror 1A, 1B so that in one position of the latter, shown in broken lines at 1A', 1B' in FIGURE 5, the respective radiometer detector 11A, 11B may "view" the respective black body 22A, 22B. In addition each mirror 1A, 1B has a further position 1A'', 1B'', also shown in broken lines in FIGURE 6, in which it directs radiation from outer space into the respective detector 11A, 11B. The stepping motors 21 are arranged to rotate the respective mirrors 1 between the positions 1, 1' and 1'' in sequence, maintaining the mirrors in position 1 for a period of about 20 minutes and in each of positions 1' and 1'' for periods of about 2 minutes. Radiometric measurements are made while the respective mirrors are in the positions 1, while calibration of the gain and zero of each radiometer channel is effected while the respective mirrors are in positions 1' and 1''.

For the selective chopping channels such as B, FIGURE 5, a "balance" calibration is carried out to check that the only difference between the signals received through the two respective chambers $2B_1$, $2B_2$ is due to the carbon dioxide absorption in the chambers. This calibration is effected by arranging for the respective narrow band filter 10B to be replaced from time to time by a filter which is outside the carbon dioxide band; any signal which is then obtained at the radiometer detector 11B is due to imbalance resulting, for example, from differential deterioration of the optical system.

In the example described above the measured radiometric intensities are used to derive the atmospheric temperature at the heights to which the different channels are "tuned." Monitoring measurements are made on each channel or selected channels of the apparatus so as to derive appropriate corrections to the radiometer measurements. Thus the following parameters may, for example, be monitored: the temperature of the reference black bodies 22 to ±½° C., the temperatures of the mirrors 1, the radiometer housing and the filter 10 to ±1° C., and the pressures of carbon dioxide in the respective absorption chamber or chambers to 3%. The last measurement enables a correction to be derived for any gas leakage occurring from the chambers in use of the apparatus.

In modifications of the apparatus different filters 10 may be mounted in respective apertures in a rotatable carrier and brought into alignment with a given channel as required. Thus the filters 10 in FIGURE 5 may be mounted on a rotatable carrier 23 so that by rotation of a stepping motor 24 different filters 10 may be brought into use in the channels A, B as required.

For measuring atmospheric temperatures as described above it is necessary to examine radiation emitted by an atmospheric constituent which is evenly distributed throughout the atmosphere, and carbon dioxide particularly commends itself in this respect. Oxygene and methane are possible alternative atmospheric components which may be used for this purpose. However, it will be appreciated that the invention is not confined to the measurement of atmospheric temperature, nor to the examination of radiation only in the infra-red region. Thus apparatus using the principle herein described may also be used for detecting atmospheric microwave emission up to millimetre wavelengths and discriminating between the origins of such emission.

An example of a further application of the invention is the determination of water vapour concentration at different regions of the atmosphere. For this purpose water vapor emission at a wavelengths near 6 microns or beyond 20 microns would be examined. The received radiation would then, of course, be passed through paths containing predetermined amounts of water vapour before detection radiometrically.

It will further be appreciated that, although interference filters have been found to be particularly suitable for use in the apparatus described above by virtue of their small size and well defined band widths, any suitable band pass filters may in principle be employed.

Alternative chopping devices to those specifically described above may be employed in the radiometer apparatus. Thus, referring to FIGURE 5, in the "selective chopping" channel B the reciprocating mirror chopper 3B may in some applications be replaced by a rotary chopper. Such a chopper may, for example, comprise two half-segments containing the respective chambers $2B_1$, $2B_2$. As such a chopper rotated it would present the chambers $2B_1$, $2B_2$ alternately to the radiation from the earth's atmosphere, serving the same function as the fixed chambers $2B_1$, $2B_2$ and oscillatory chopper mirror 3B of FIGURE 5.

A further application envisaged for the present invention is shown in FIGURES 8 to 13 and is adapted for the detection of atmospheric inhomogeneities, for example, temperature differences in a given region of the atmosphere remote from the site of measurement.

The detection of turbulence at high altitudes especially in clear air, has been a problem of increasing importance in recent years. Clear air tubulence is such that a normal subsonic aircraft will encounter severe clear air turbulence (accelerations in excess of 0.5 g) once in every one hundred flights. Although such encounters are not, in general, disastrous they can be extremely uncomfortable for both passengers and crew. The physical conditions under which clear air turbulences occur appear to be divided into two main classes. The first class is of orographic origins found near hill and mountain ranges and is of a wave type nature, possibly in the formation of gravity type wave disturbances of stable or unstable character along a quasi-horizontal interface with warm air on the top of cold air. The second class seems to be associated with rather marked vertical vector wind shears produced by drastic changes of wind direction through relatively shallow layers normally 2,000 thick, 10 to 20 miles in width and 50 to 100 miles in length. These latter mainly occur in the neighborhood of jet streams especially where a stream is turning, in troughs or confluent regions between two jet streams, or in the region between two merging jet branches.

Various physical techniques have been suggested for sensing clear air turbulence, such as, for example optical, radiometric, and normal radar techniques and the backscattering of laser beams. Clear air turbulence occurrences are, it is believed, related or associated with meso- and micro-scale atmospheric temperature distributions and it is generally considered that turbulent prone areas on the synoptic scale do tend to contain large horizontal temperature gradients. Air temperature changes of at least 1° C. at the rate of 1° C./min. have been detected, i.e. a gradient of 1° C. in 7 to 10 miles and extending over that distance.

Figure 8:
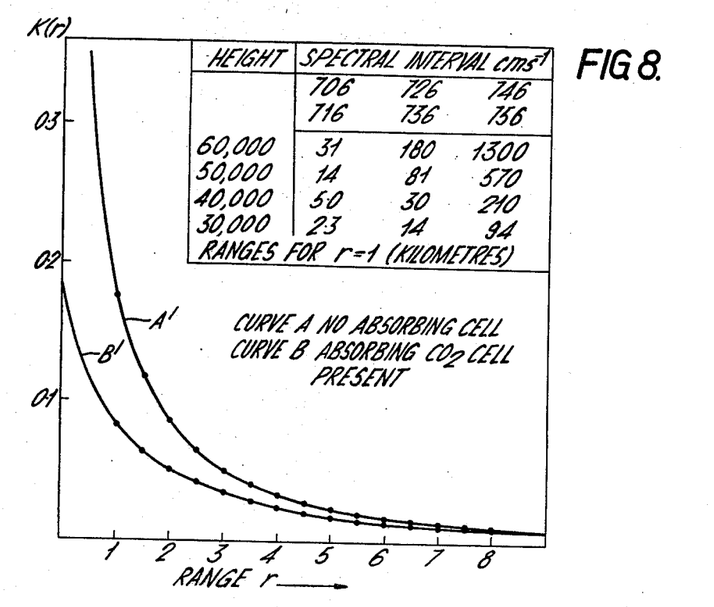
FIGURE 8 illustrates graphically the resolution obtainable with a further embodiment of the invention.

The weighting function for a radiometer viewing in a narrow spectral interval in a horizontal direction is given in FIGURE 8, curve A'. The weighting function for an instrument containing an absorbing cell is shown in curve B' of FIGURE 8. The pressure and path length of $CO_2$ gas in this cell defines the amount of energy absorbed, mainly near the line centres i.e. for short ranges. This increases the sensitivity of the instrument to energy originating at the longer ranges.

As an alternative to using the instrument as a simple filter radiometer and detecting temperature gradients as signal changes with time, it is possible to compare the signal in two or more spectral intervals. The difference between such signals can be balanced out when viewing a constant temperature atmosphere. However, the presence of a temperature gradient at some distance ahead of the instrument will produce a much larger signal change in the spectral interval closer to the transparent region of the absorption band. The resultant signal is proportional to the amount of unbalance, indicating temperature change independance of the signal history with time. This additional information could also be obtained by comparing signals that have pased through different absorption path lengths of $CO_2$. The system could be balanced to give zero output for a constant temperature atmosphere as before.

Figure 9:
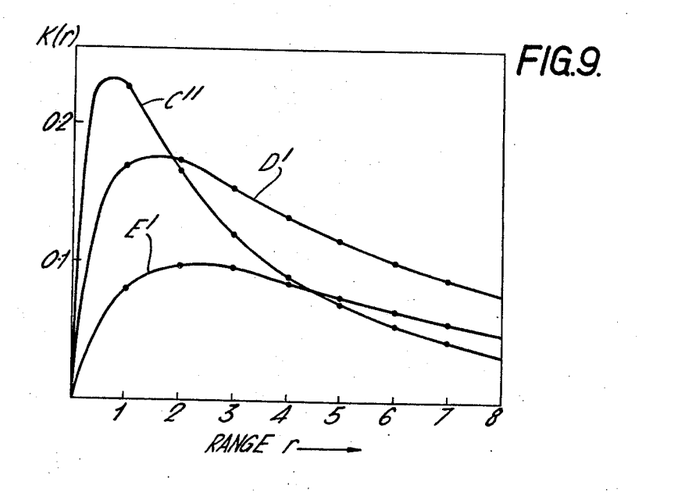
FIGURE 9 further illustrates graphicaly the resolution obtainable.

The difference weighting functions obtained are shown in FIGURE 9; the curve D' is for two different absorbing path lengths in the same spectral interval, curve E', is for the combination of different absorbing path lengths and spectral intervals and curve C" is for different spectral intervals chosen to pass through the origin without normalising. These curves all give a peaked weighting function indicating horizontal resolution is possible. In addition the ratio of the range factor at peak to half-width is the same for all three curves, so that on normalising, similar curves would result. For a given requirement of range at a given height, curve C" is virtually defined and the spectral intervals readily optimised.

Consider the combination of the expected weighting function with temperature changes occurring horizontally in front of the instrument. The total energy received in the given spectral interval when the instrument is viewing horizontally through an atmosphere at a constant temperature is a constant times the integral under the curve in the FIGURES 8 and 9. Changes in temperature effectively raise the level of the curve, if such a temperature change occurs over part of the range then the level of that part of the curve changes. If the instrument is moving towards such a temperature gradient then the signal level will change as a function of time.

The curves A' and B', in effect, show the increase in signal as an aircraft flies towards a block of warm air (decreasing range). The use of a function curve C", gives a signal which changes through a nulled zero (constant temperature) to a maximum value as the block is approached. Signal history is only necessary to obtain range information but not to indicate that a block of warm air is present.

Figure 10:
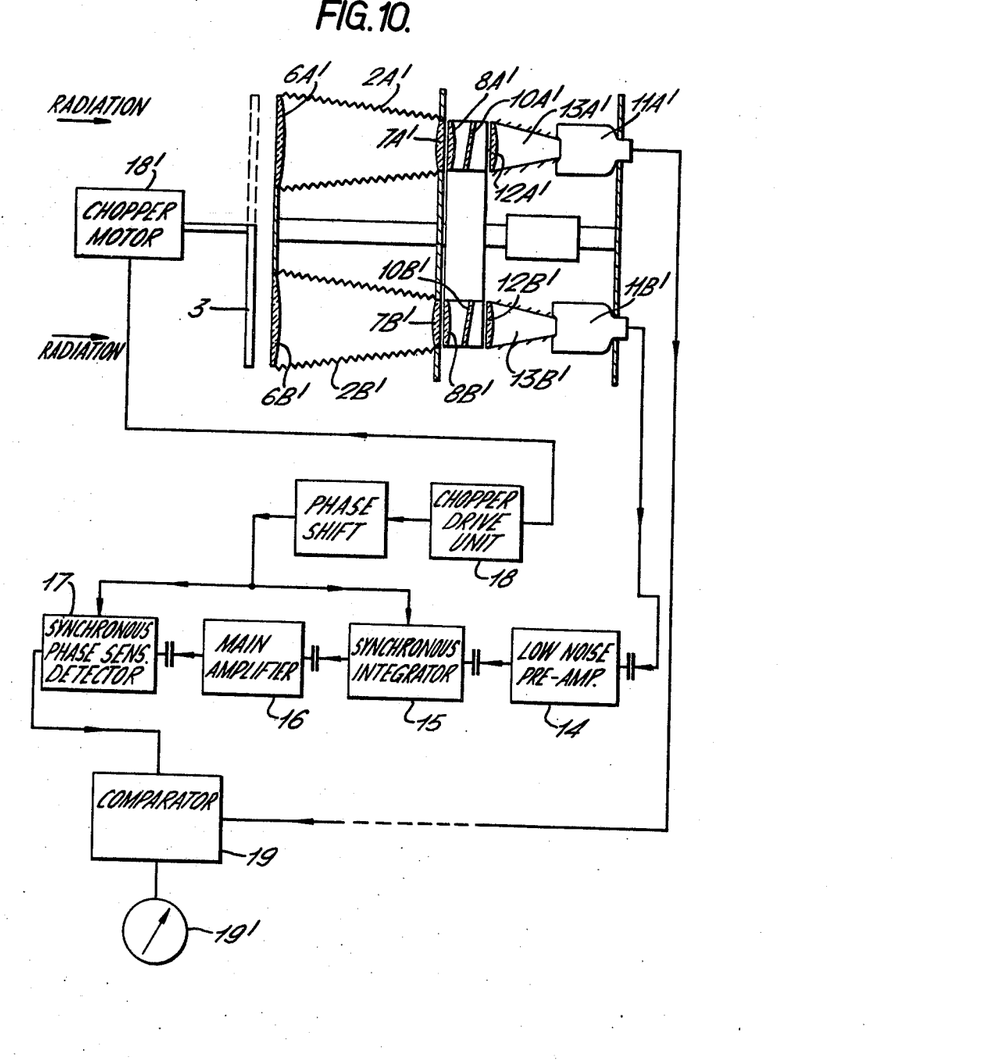
FIGURE 10 illustrates diagrammatically apparatus according to the further embodiment of the invention.

A practical embodiment of the radiometer apparatus according to this embodiment of the invention is illustrated diagrammatically in FIGURE 10. The apparatus will not be described in detail since it is very similar to that shown in FIGURE 5. Like parts have been designated with like reference numerals but those of FIGURE 10 are primed.

Two substantially identical channels A' and B' are illustrated in FIGURE 10, channel A' being an absorption channel and responsive to radiation from a nearer atmospheric distance and channel B' being an absorption channel responsive to radiation from a further distance. Each channel is arranged to be mounted with its axis substantially horizontal and radiation from a predetermined region of the atmosphere (and the intervening atmosphere) within a given solid angle (approximately 10° in section) is directed into each channel A' and B'.

An absorption chamber 2A', filled with a predetermined pressure of carbon dioxide, is provided in channel A' and a further absorption chamber 2B' is provided in channel B'. The chamber 2B also contains carbon dioxide at a predetermined pressure different from that of chamber 2A'.

A rotary chopper device 3 is mounted in front of the channels A' and B' and is arranged so that only one of the channels receives radiation at any one time. Thus the chopper may comprise a disc one half of which is transparent to radiation and the other half of which is opaque to radiation. In an aircraft installation a rotary chopper device, to which reference was made above, would, in vew of its smaller susceptibility to external vibration be preferable to the vibratory chopping device described for the apparatus of FIGURES 5 and 6.

The optical system of each channel A' and B' is substantially identical with that shown in FIGURE 5 and will not be further described.

The electronic circuit associated with one of the detector 10B[1] is illustrated schematically in FIGURE 10 and is substantially identical with that shown in FIGURE 5. It will be understood that a similar circuit is provided for detector 11A. The drive unit 18 drives the motor 18' of the chopper 3.

The outputs of the respective phase sensitive detectors are fed to a comparator 19 and the signal from the compartor 19 may be displayed by means of a display device, such as meter 19' in the cockpit of an aircraft in which the apparatus may be mounted.

Figure 11:
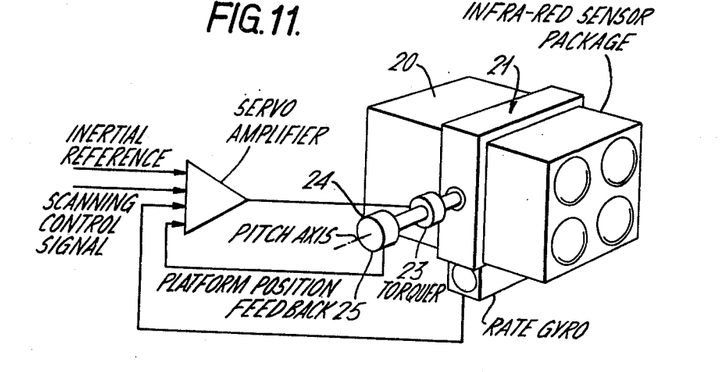
FIGURE 11 shows schematically the mounting of the apparatus of FIGURE 10.
Figure 12:
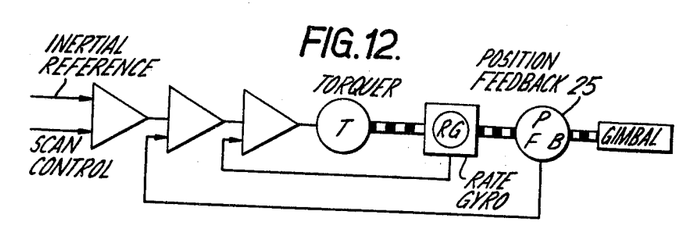
FIGURE 12 illustrates the control of the mounting shown in FIGURE 10.

Turning now to FIGURE 11, this figure shows schematically a further apparatus 20 for detecting clear air turbulence. The apparatus 20 is mounted on a platform 21, each axis of which is provided with a rate-gyro 22 which controls the input to a slab type torquer 23 mounted on the gimbal axis 24. Referring to FIGURE 12 it will be seen that long term location of the platform is provided by a positive feed back sensor 25 on the gimbal axis in conjunction with inertial reference inputs and scan control signals. The platform 21 may be provided with a mechanism (not shown) for scanning in azimuth and elevation so that readings of temperature changes are taken over an area.

It will be clear that stabilisation of the apparatus is necessary to insure that the apparatus receives radiation from substantially the same region as the atmosphere independent of the attitude of the aircraft. Preferably the stabilisation should be provided to an accuracy of $\frac{1}{10}°$ in the presence of air-frame movements of up to ±5°.

Figure 13:
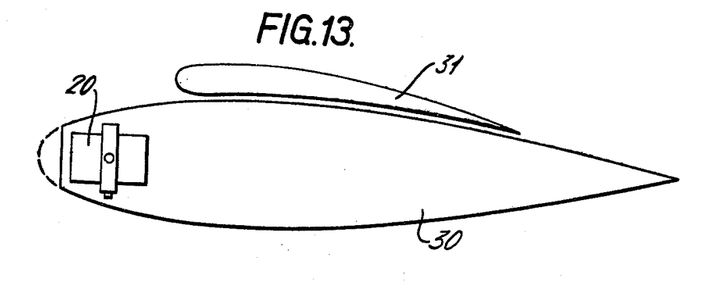
FIGURE 13 illustrates the mounting of the further embodiment of the invention in an aircraft.

FIGURE 13 discloses the installation of the apparatus 20 in the wing tip fuel tank 30 of an aircraft having a main wing 31. In the mounting of the apparatus it is necessary to provide the clear forward view over a field ±10° azimuth and the ability to scan over ±45° azimuth through the vertical field of 1°±5° vertical scan. It would be possible to mount the apparatus in the aircraft nose which would be an ideal position but this is usually fully occupied in present aircraft and thus a wing tip fuel tank provides a good alternative position. It is possible to use the apparatus according to the present invention to make other types of measurement:

(1) Transverse temperature changes

If the optical depth is defined by similar combination of interference filters and $CO_2$ absorption chambers as described previously it is possible to detect the temperature changes in front of the aircraft at right angles to the flight path. This may be achieved, for example, by using a chopper device with equal transparent and opaque parts and a suitable optical system such that the detector sees radiation from all of the chopper blade, plus an equal area uncovered. The uniform background then gives no signal. Any temperature structure perpendicular to the flight path, which is significant in size comparative to the fields of view will however, be detected. The phase of such signal also gives positional information. With sufficient signals to noise ratio, transverse temperature structure could also be investigated by simply scanning horizontally. For this application an angular beam size of 5° by 1° might be appropriate.

(2) Vertical temperature structure

An obvious variant to the device is to scan vertically rather than horizontally. This will detect a signal due to the normal vertical lapse rate. Such rate could be compared at different ranges to look for abnormalities.

The combination of (1) and (2) is a matter for three dimensional soundings of temperature in front of the aircraft.

(3) Motional chopping

Instead of using a rotary chopper device it is possible to use the motion of cells of air (assuming a different temperature to adjacent cells) to provide an alternating component to the signal reaching the detector. Thus the motion provides the function of the chopper in the previous systems. Effectively a frequency analysis of the signal would be required. Again the effects at different ranges could be compared.

A yet further application of the "selective chopping" principle to radiometer apparatus is to provide a so-called "spatial" chop. According to this mode of operation a chopper device as defined above is disposed in an image plane of the radiometer apparatus so that, in operation of the chopper device, the radiometer detector receives radiation alternately from different adjacent areas of a region of the atmosphere located at a range selected by the "selective chopping" principle as described above. The occluding area of the chopper device is arranged to be half the area of the image field so that equal quantities of radiation are received from the two areas alternately. Any inhomogeneity between the two areas due, for example, to a temperature difference in the atmospheric component under examination will be detected by the radiometer apparatus. Such method is also capable of detecting regions of atmospheric clear air turbulence remotely.

We claim:

1. Apparatus for indicating radiation emitted from a predetermined region of an atmosphere, said apparatus comprising an optical system for collecting radiation emitted from said atmosphere over a given solid angle, band pass filter means for passing a predetermined band of the emission spectrum of a given component of said atmosphere, said component having absorption lines in said band, a chopper device for interrupting the received radiation cyclically, a first chamber containing a predetermined amount of said atmospheric component, a second chamber containing a predetermined smaller amount of said atmospheric component than is contained in said first chamber, a detector means, the chopper device being adapted to cause the filtered radiation to pass to the detector means through the first and second chambers alternately, said detector means being tuned to the cyclic chopping frequency and adapted to provide an output signal which is dependent upon the radiation intensity and corresponds to radiation at the wavelengths of the centres of the absorption lines in the pass band of the filter means, said wavelengths being such that the atmospheric absorption coefficients at said detected wavelengths are substantially the same and the radiation is known to originate predominantly from said predetermined region of the atmosphere.

2. Apparatus as claimed in claim 1 in which the optical system is adapted to receive radiation emitted in a substantially horizontal direction from the atmosphere, the detected wavelengths of the emitted radiation being so chosen that the radiation is known to originate predominantly from a region at a predetermined horizontal range, the intensity of the detected radiation providing an indication of an atmospheric parameter such as temperature in said region, the first and second chambers being both provided with detector means, the radiation received by each said detector means being known to originate from regions at different predetermined horizontal ranges respectively, the chopper device being arranged to direct radiation emitted by the atmosphere through the first and second chambers alternately, and the atmospheric parameter being indicated by chopping the detected signals from both said detector means.

3. Apparatus as claimed in claim 1 in which the chopper device comprises a rotary member which is arranged to direct radiation emitted by the atmosphere through the first and second chambers alternately.

4. Apparatus as claimed in claim 3 in which the chopper device rotates in an image plane of the optical system and remains at all times in the field of view of the detector means, the occluding area of the chopper being substantially half the area of the field of view in the image plane.

5. Apparatus as claimed in claim 1 in which the filter means comprises a multi-layer interference filter.

6. Apparatus as claimed in claim 5 in which the successive layers of the interference filter are deposited on a plane surface or a lens in the optical system.

7. Apparatus as claimed in claim 1 in which the radiation is directed into the detector means by means of a light guide having a frusto-conical reflecting surface.

8. Apparatus for indicating radiation emitted from a predetermined region of an atmosphere, the apparatus being adapted to be mounted on a platform above the emitting regions of the atmosphere and comprising an optical system for collecting radiation emitted from said atmosphere in a relatively large solid angle from directly beneath the apparatus, band pass filter means for passing a predetermined band of the emission spectrum of a given component of said atmosphere, said component having absorption lines in said band, a chopper device for interrupting the received radiation cyclically, a chamber through which the chopper device causes the radiation to pass periodically, said chamber containing a predetermined amount of said atmospheric component, and detector means tuned to the cyclic chopping frequency and adapted to provide an output signal which is dependent on the radiation intensity at wavelengths of said absorption lines, said wavelengths being such that the atmospheric absorption coefficients at said detected wavelengths are substantially the same and the detected radiation passed by the filter means is known to originate predominantly in a predetermined atmospheric level, whereby the intensity of said detected radiation provides an indication of an atmospheric parameter such as temperature at said level.

9. Apparatus as claimed in claim 8 in which a fixed inclined mirror is disposed in the entrance aperture of the chamber covering substantially half said aperture, said mirror being arranged to direct a reference background radiation through one half of the chamber, the other half being arranged to receive the atmospheric radiation, and the chopper device comprising a cyclically movable vibratory member which alternately admits through the background radiation and the atmospheric radiation.

10. Apparatus as claimed in claim 9 in which the chopper device comprises an oscillatory black member which at all times remains in the field of view of the detector means.

11. Apparatus as claimed in claim 9 in which said reference background radiation is provided by a part of the optical system which is adapted to receive radiation from outer space.

12. Apparatus according to claim 8 in which the chopper device comprises a movable reflector which is arranged to direct radiation emitted by the atmosphere through the first and second chambers alternately, the optical system being arranged to direct a reference background radiation through the chamber which is not transmitting atmosphere radiation.

13. Apparatus as claimed in claim 8 in which the filter means comprises a multi-layer interference filter.

14. Apparatus as claimed in claim 13 in which the successive layers of the interference filter are deposited on a plane surface of a lens in the optical system.

15. Apparatus as claimed in claim 8 in which the radiation is directed into the detector means by means of a light guide having a frusto-conical reflecting surface.

16. Apparatus as claimed in claim 8 in which a single said chamber is provided, the amount of said component being such that radiation at the wavelengths of the centres of the absorption lines is absorbed and the detector means detects radiation at wavelengths closely adjacent the said line centres.

17. Apparatus as claimed in claim 16 in which the chopper device is disposed in the entrance aperture of the optical system.

18. Apparatus as claimed in claim 8 in which the chopper is arranged to direct into the detector means radiations from different spatial areas in the said region alternately, whereby the detector means are responsive to differences in the intensity of radiation received from such areas to provide an indication of relative inhomogeneities therebetween.

19. Apparatus for indicating radiation emitted from a predetermined region of an atmosphere, comprising an optical system for collecting radiation emitted from said atmosphere over a given solid angle in a substantially horizontal direction, band pass filter means for passing a predetermined band of the emission spectrum of a given component of said atmosphere, said component having absorption lines in said band, a chopper device for interrupting the received radiation cyclically, a chamber through which the chopper device causes the radiation to pass periodically, said chamber containing a predetermined amount of said atmospheric component, and detector means tuned to the cyclic chopping frequency and adapted to provide an output signal which is dependent on the radiation intensity at wavelengths of said absorption lines, said wavelengths being such that the atmospheric absorption coefficients at said detected wavelengths are substantially the same and the detected radiation passed by the filter means is known to originate predominantly from a region at a predetermined horizontal range, the intensity of the detected radiation providing an indication of an atmospheric parameter such as temperature in said region.

20. Apparatus as claimed in claim 19 in which a single said chamber is provided, the amount of said component being such that radiation at the wavelengths of the centres of the absorption lines is absorbed and the detector means detects radiation at wavelengths closely adjacent the said line centres.

21. Apparatus as claimed in claim 20 in which the chopper device is disposed in the entrance aperture of the optical system.

22. Apparatus as claimed in claim 19 in which the chopper is arranged to direct in to the detector means radiations from different spatial areas in the said region alternately, whereby the detector means are responsive to differences in the intensity of radiation received from such areas to provide an indication of relative inhomogeneities therebetween.

23. Apparatus as claimed in claim 19 in which the apparatus is mounted in an aircraft on a platform to detect inhomogeneities in the atmosphere ahead of the aircraft.

24. Apparatus as claimed in claim 23 in which the platform on which the apparatus is mounted is stabilized so the apparatus received radiation from substantially the same region of the atmosphere independent of the attitude of the aircraft.

25. Apparatus as claimed in claim 24 in which means are provided to oscillate the platform in at least the horizontal direction so that the apparatus scans the said region of the atmosphere.

26. Apparatus as claimed in claim 19 in which the fitler means comprises a multi-layer interference filter.

27. Apparatus as claimed in claim 26 in which the successive layers of the interference filter are deposited on a plane surface or a lens in the optical system.

28. Apparatus as claimed in claim 19 in which the radiation is directed into the detector means by means of a light guide having a frusto-conical reflecting surface.

References Cited

UNITED STATES PATENTS

| | | | |
|---|---|---|---|
| 2,212,211 | 8/1940 | Pfund | 73—355 |
| 2,674,155 | 4/1954 | Gibson | 73—355 XR |
| 2,677,277 | 5/1954 | Machler | 73—355 |
| 2,978,589 | 4/1961 | Howell. | |
| 2,909,924 | 10/1959 | Flook et al. | 73—355 |
| 3,103,586 | 9/1963 | Ovrebo et al. | |

LOUIS R. PRINCE, Primary Examiner

FREDERICK SHOON, Assistant Examiner

U.S. Cl. X.R.

250—83.3; 343—100